United States Patent [19]
Manners

[11] 3,858,084
[45] Dec. 31, 1974

[54] VOLTAGE PROTECTION CIRCUIT

[75] Inventor: David Eugene Manners, Alexander, N.Y.

[73] Assignee: GTE Sylvania Incorporated, Stamford, Conn.

[22] Filed: May 11, 1973

[21] Appl. No.: 359,614

[52] U.S. Cl. ............................................ 315/387
[51] Int. Cl. ............................................ H01j 29/70
[58] Field of Search ......... 315/27 TD, 27 R, 28, 29, 315/20

[56] References Cited

UNITED STATES PATENTS

| | | | |
|---|---|---|---|
| 3,351,804 | 11/1967 | Kongable et al. | 315/20 |
| 3,629,644 | 1/1970 | Waybright | 315/29 |
| 3,646,392 | 2/1972 | Zahnen | 315/29 |
| 3,767,960 | 10/1973 | Ahrens | 315/27 TD |

*Primary Examiner*—Maynard R. Wilbur
*Assistant Examiner*—J. M. Potenza
*Attorney, Agent, or Firm*—Norman J. O'Malley; Robert E. Walrath; Cyril A. Krenzer

[57] ABSTRACT

Protection circuitry to protect against excessive voltages due to a deflective voltage regulator or other similar causes is shown. A voltage sensor detects when the regulated voltage exceeds a threshold and gates a controlled rectifier. In one embodiment the controlled rectifier disables the horizontal deflection circuitry of a television receiver to prevent high voltage generation. In another embodiment the controlled rectifier shunts the regulator transistor to limit the regulated voltage and cause a circuit breaker to open.

11 Claims, 4 Drawing Figures

VOLTAGE PROTECTION CIRCUIT

CROSS-REFERENCE TO RELATED APPLICATION

D. E. Manners, "Voltage Regulator Short Circuit Protection," Ser. No. 345,980, filed Mar. 29, 1973, and assigned to the same assignee as the present invention.

BACKGROUND OF THE INVENTION

This invention relates to overvoltage protection circuitry. If an overvoltage occurs in a voltage supply, for example, due to component failure such as a regulator transistor failure, serious damage can occur to circuitry energized by the voltage supply. Additionally, in systems such as television receivers having interdependent voltage supplies, an overvoltage from one supply can cause overvoltages from other dependent supplies. For example, the high voltage applied to the cathode ray tube anode can be derived from the horizontal deflection circuitry. Since the horizontal deflection circuitry is biased by a B+ voltage supply, the amplitude of the high voltage is dependent on the B+ level. If a B+ overvoltage occurs, the high voltage can increase to sufficiently high levels to cause component damage and arcing and can cause increased harmful radiations particularly by a color cathode ray tube.

In the prior art numerous forms of protective circuits are known to protect both the power supply and circuitry energized thereby. Also, in television receivers various techniques have been proposed for detecting and limiting an increase in high voltage. One known technique involves indirectly sensing the high voltage and then changing the frequency of the horizontal oscillator to make the television picture unviewable. Such prior art techniques, however, suffer from a number of disadvantages such as high cost, complex circuitry, adverse effect on circuit operation, low sensitivity to overvoltage, and similar other disadvantages.

OBJECTS AND SUMMARY OF THE INVENTION

Accordingly, it is a primary object of the invention to obviate the above-noted and other disadvantages of the prior art.

It is a further object to provide protection circuitry to protect against power supply overvoltages.

It is a still further object to provide a voltage protection circuit that provides a positive indication of power supply overvoltages.

It is yet another object to provide simple, economical and reliable voltage protection circuitry.

In one aspect of the invention these and other objects and advantages are achieved in protection circuitry that includes a source of energizing voltage, sensing means, current control means, and a load shunted by the current control means. The sensing means provides a control signal in response to voltages from the source that exceed a threshold. The current control means switches from a first conducting condition to a second conducting condition in response to the control signal.

In another aspect of the invention protection circuitry for a voltage regulator having a series regulator transistor includes sensing means and current control means. The sensing means provides a control signal when the output voltage of the regulator transistor exceeds a threshold. The current control means is connected between an input electrode of the regulator transistor and a reference potential level for shorting the input electrode of the regulator transistor in response to the control signal from the sensing means.

DETAILED DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figures 1, 2:
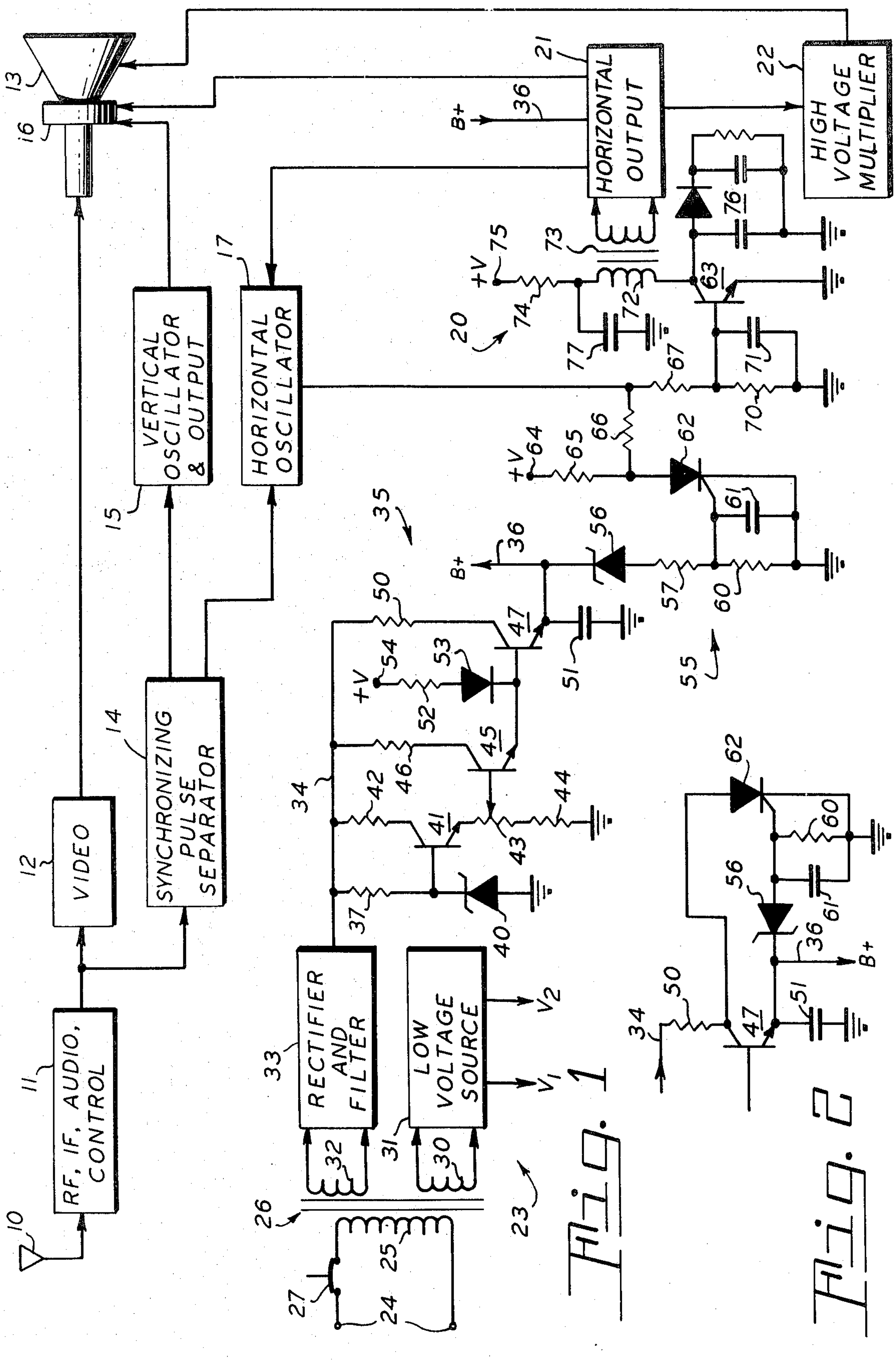
FIG. 1 is a schematic diagram of one embodiment of the invention utilized in a television receiver shown in block diagram form.
FIG. 2 is a schematic diagram of a second embodiment of the invention.

In FIG. 1 the invention is illustrated as part of a television receiver with typical circuitry of a television receiver illustrated in a simplified block form. A signal receiving device illustrated as an antenna 10 is connected to a block 11, which includes typical radio frequency (RF) tuner, intermediate frequency (IF) amplifier, audio, and control circuitry. A video detector provides a composite video signal to video channel 12 which in the case of a color television receiver includes both luminance and chrominance channels. Video channel 12 provides video signals to a cathode ray tube (CRT) 13. The composite video signal is also coupled to a synchronizing pulse separator 14 which provides separated synchronizing pulses to the deflection apparatus. The vertical deflection apparatus includes vertical oscillator and output circuitry 15 which provides vertical deflection signals to the vertical windings of a deflection yoke 16. The horizontal deflection circuitry includes a horizontal oscillator 17, drive circuitry 20, and output circuitry 21. Horizontal output circuitry 21 provides horizontal deflection signals to the horizontal windings of yoke 16 and feedback pulses to horizontal oscillator 17 to provide a phase comparison to the received synchronizing pulses. Horizontal output circuitry 21 also provides pulses to a high voltage circuit illustrated as a high voltage multiplier 22. High voltage circuit 22 generates the high voltage or anode voltage for CRT 13.

A source of energizing voltage 23 includes terminals 24 adapted to be connected to a source of alternating voltage via an on-off switch. Terminals 24 are connected to opposite ends of a primary winding 25 of a power transformer 26. Preferably a circuit breaker 27 is connected between one of terminals 24 and primary winding 25. A secondary winding 30 of transformer 26 is connected to a low voltage source 31 which provides typical low energizing voltages such as $V_1$ and $V_2$ for application to various active circuits in the television receiver. A secondary winding 32 of transformer 26 is connected to a rectifier and filter 33 which provides an unregulated voltage via a conductor 34. A voltage regulator 35 is connected to conductor 34 and provides a regulated energizing voltage B+ via a conductor 36.

Voltage regulator 35 includes a resistor 37 connected in series with a zener diode 40 between conductor 34 and a common conductor illustrated as ground. The junction of resistor 37 and zener diode 40 is connected to a base of a transistor 41 which has a collector connected via a resistor 42 to conductor 34. An emitter of transistor 41 is connected by the resistance element of a potentiometer 43 in series with a resistor 44 to ground. The tap of potentiometer 43 is connected to a base of a driver transistor 45 which has a collector connected via a resistor 46 to conductor 34. An emitter of transistor 45 is connected to a control electrode or base of a regulator transistor 47 which has an input electrode or collector connected via a resistor 50 to conductor 36. An output electrode or emitter of transistor 47 is connected to conductor 36 and by a capacitor 51 to ground thereby connecting transistor 47 as a series regulator transistor.

In operation zener diode 40 establishes a reference voltage at the base of transistor 41. Since transistor 41 is connected as an emitter-follower, the voltage across potentiometer 43 and resistor 44 is slightly less than the voltage across zener diode 40. Potentiometer 43 provides an adjustable constant voltage at the base of transistor 45. Thus, the emitter voltages of emitter-follower transistors 45 and 47 are regulated to regulate the voltage on conductor 36.

A resistor 52 and a diode 53 are series connected between a source of low voltage illustrated as a terminal 54 and the base of transistor 47. If the voltage on conductor 36 should drop to a low value due to a short circuit or some other reason, diode 53 will become forward biased to provide sufficient current to saturate transistor 47 thereby limiting the voltage across and power dissipation of transistor 47 to a safe level. The large current flow through transistor 47 will cause circuit breaker 27 to open thereby protecting the voltage regulator components. For this purpose source 54 should be independent of the voltage on conductor 36 and can be one of the voltages provided by source 31.

The regulated energizing voltage B+ on conductor 36 is utilized for energizing circuitry in the television receiver such as horizontal output circuitry 21 and high voltage multiplier 22. If the voltage on conductor 36 increases due to a circuit failure such as regulator transistor 47 shorting, the overvoltage can damage circuit components energized thereby. Also, since the high voltage supplied by multiplier 22 will increase when the B+ voltage increases in typical television receivers, the overvoltage can also cause damage to multiplier 22 and/or CRT 13 and can deleteriously affect the operation of CRT 13.

Protection circuitry 55 in accordance with the invention is connected to conductor 36 and to a load which in the embodiment of FIG. 1 comprises horizontal drive circuitry 20. Protection circuitry 55 includes a sensing means illustrated as a zener diode 56 connected in series with resistors 57 and 60 between conductor 36 and circuit ground. A capacitor 61 is connected in parallel with resistor 60. A current control means illustrated as a controlled rectifier 62 has a control electrode connected to the junction of resistors 57 and 60 to receive a control signal provided by the sensing means. Controlled rectifier 62 further has an output electrode or anode connected to drive circuitry 20 and a common electrode or cathode connected to a reference potential level such as circuit ground.

In the embodiment of FIG. 1 drive circuitry 20 includes a driver transistor 63. A source of energizing potential illustrated as a terminal 64 is connected by a bias circuit comprising a series combination of resistors 65, 66, 67, and 70 to ground. The output electrode of controlled rectifier 62 is connected to the junction of resistors 65 and 66 so that controlled rectifier shunts the bias circuitry of driver circuitry 20. The output of horizontal oscillator 17 is connected to the junction of resistors 66 and 67, while the junction of resistors 67 and 70 is connected to a base of transistor 63. The base of transistor 63 is further connected by a capacitor 71 to ground. An emitter of transistor 63 is connected to ground and a collector is connected by a primary winding 72 of a coupling transformer 73 in series with a resistor 74 to a source of energizing potential illustrated as a terminal 75. A secondary winding of transformer 73 is connected to horizontal output circuitry 21. A wave shaping circuit 76 is connected to the collector of transistor 63. A capacitor 77 is connected between the junction of resistor 74 and primary winding 72 and ground. Sources 64 and 75 can be part of source 31.

In operation, if the energizing voltage on conductor 36 rises above the breakdown potential of zener diode 56, current will flow through resistors 57 and 60 and capacitor 61 will begin to charge providing a control signal at the control electrode of controlled rectifier 62. If the voltage at the control electrode of controlled rectifier 62 becomes sufficiently high to cause controlled rectifier 62 to switch from a first or nonconducting condition to a second or conducting condition, the output electrode of controlled rectifier 62 will drop to near ground potential thereby cutting off the bias of transistor 63 to alter the operation of or disable the horizontal deflection circuitry. When horizontal output circuitry 21 is disabled or inactive, no high voltage will be generated by multiplier 22 thereby preventing damage or deleterious operation of CRT 13.

The embodiment of FIG. 1 will prevent operation of the horizontal deflection and high voltage generation circuitry, but it will not stop source 23 from providing energizing voltage unless sufficient current is drawn to cause circuit breaker 27 to open. The embodiment of FIG. 2 assures that circuit breaker 27 will open. In FIG. 2 like components are numbered the same as in FIG. 1. Resistor 57 is deleted in FIG. 2 but can be added if desired. Regulator transistor 47 is substituted as the load for controlled rectifier 62 by connecting the output electrode of controlled rectifier 62 to the input electrode or collector of series regulator transistor 47 instead of the junction of resistors 65 and 66. When controlled rectifier 62 becomes conductive in response to a control signal from the sensing means, the collector of transistor 47 is shorted to a reference potential level or ground thereby causing the voltage across capacitor 51 and on conductor 36 to decay to a low level. Excessive current flow through resistor 50 and controlled rectifier 62 will cause circuit breaker 27 to open thereby disabling the entire television receiver. In the embodiment of FIG. 2 the voltage on conductor 36 will be limited such that damage to circuitry energized thereby will be prevented.

Figure 3:
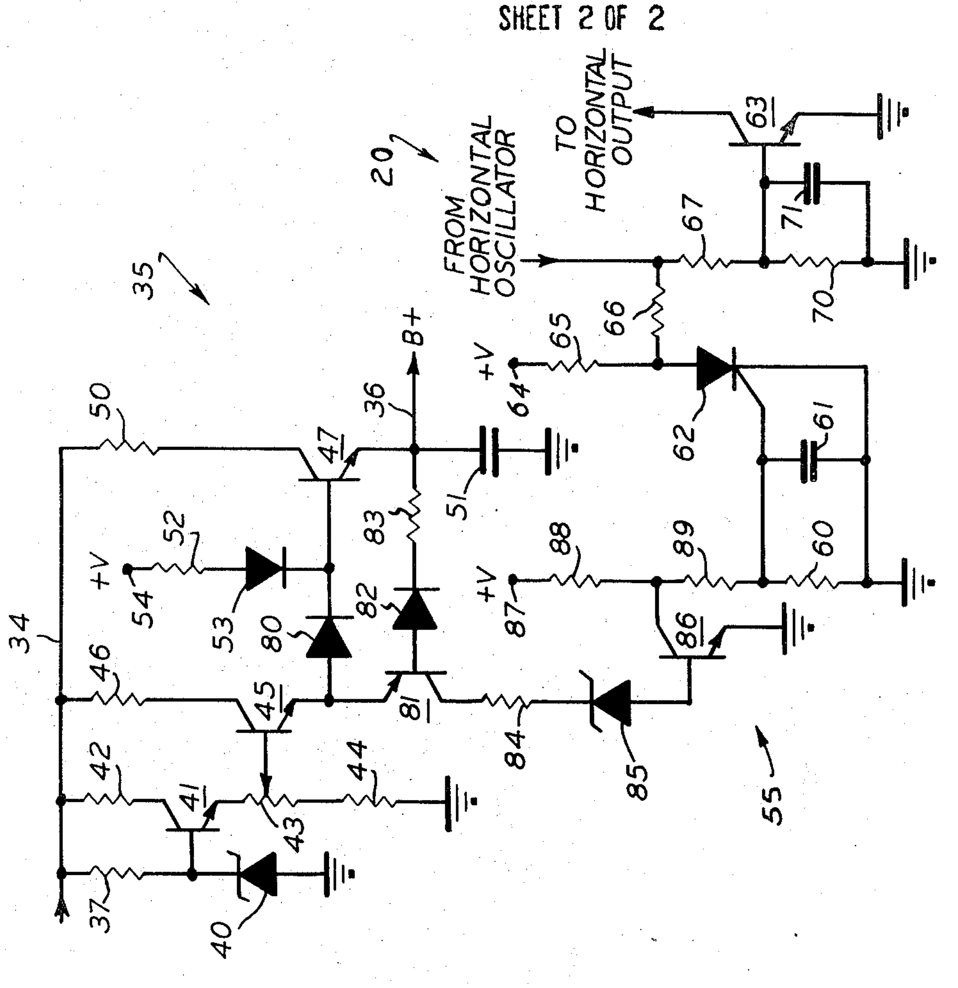
FIG. 3 is a schematic diagram of another embodiment of the invention with greater sensitivity.

FIG. 3 illustrates a further embodiment of the invention wherein the sensing means has greater sensitivity to overvoltages on conductor 36. Like components are numbered the same as in FIG. 1. In FIG. 3 a diode 80 is connected between the emitter of transistor 45 and the base of transistor 47. A sensing transistor 81 has a reference electrode or emitter connected to the emitter of transistor 45 and an input electrode or base connected by a diode 82 in series with a resistor 83 to conductor 36. An output electrode or collector of transistor 81 is connected by a resistor 84 in series with a zener diode 85 to a base of a transistor 86. A source of energizing potential illustrated as a terminal 87 is connected by resistors 88 and 89 to the control electrode of controlled rectifier 62. A collector of transistor 86 is connected to the junction of resistors 88 and 89, and an emitter of transistor 86 is connected to ground. Compared to FIG. 1, zener diode 56 and resistor 57 of the sensing means are replaced by components 80–89.

In operation the emitter of resistor 45 is a point of reference potential. Diode 80 is normally forward biased. The forward voltdrops of diode 80 and the base-to-emitter junction of transistor 47 are sufficient to cause transistor 81 to conduct. Thus, current flows through transistor 81, resistor 84, and zener diode 85 to turn transistor 86 on thereby holding the control electrode of controlled rectifier 62 at a low potential. If the voltage on conductor 36 increases with respect to the emitter voltage of transistor 45, for example, because transistor 47 shorts, transistor 81 will turn off. Zener diode 85 prevents leakage currents from reaching transistor 86. Accordingly, transistor 86 turns off and current flow from source 87 through resistors 88 and 89 to the control electrode of controlled rectifier 62 turns controlled rectifier 62 on as was described in connection with FIG. 1. Diodes 80 and 82 protect transistor 81 by blocking excessive voltages from the emitter and base. The sensing means of FIG. 3 is more sensitive than the sensing means of FIG. 1 because a lesser overvoltage or increase in the voltage on conductor 36 will cause the sensing means to provide a control signal to controlled rectifier 62 while the sensing means will still remain unresponsive to normal operating variations and/or adjustments of the voltage.

Figure 4:
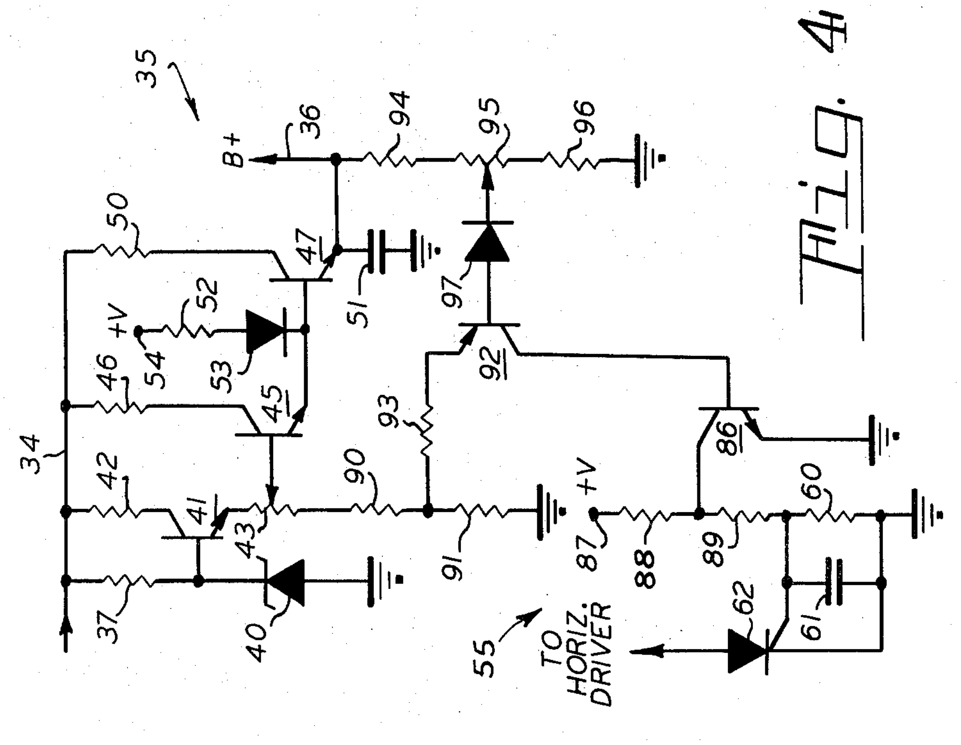
FIG. 4 is a schematic diagram of an alternate to the embodiment illustrated in FIG. 3.

In FIG. 4 an alternate embodiment of the protection circuit of FIG. 3 is illustrated. The same reference numerals are used in FIG. 4 for like components. Resistor 44 is replaced by series connected resistors 90 and 91 with the junction therebetween providing a point of reference potential for the sensing transistor. Components 80–85 of the sensing means of FIG. 3 are replaced by a sensing transistor 92 which has an output electrode or collector connected to the base of transistor 86 and a reference electrode or emitter connected by a resistor 93 to the junction of resistors 90 and 91. A resistor 94, the resistance element of a potentiometer 95, and a resistor 96 are connected in series between conductor 36 and ground. An input electrode or base of transistor 92 is connected by a diode 97 to a tap of potentiometer 95. The sensing means of FIG. 4 operates substantially the same as that of FIG. 3. The operating voltages on transistor 92 can be much lower, however, than the voltages on transistor 81. Also, since the reference potential applied to the emitter of transistor 92 is derived from a point in voltage regulator 35 before transistor 45, failure of transistor 45 can also activate the protection circuitry. Potentiometer 95 permits the threshold of the sensing means to be adjusted so that the sensing means can be made more or less sensitive to overvoltages.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a television receiver having horizontal deflection circuitry including drive circuitry, protection circuitry comprising:

a source of energizing voltage connected to said horizontal deflection circuitry for providing an energizing voltage thereto;

sensing means connected to said source for providing a control signal in response to voltages from said source exceeding a threshold;

a controlled rectifier having an output electrode and a control electrode connected to said sensing means for switching from a first conducting condition to a second conducting condition in response to said control signal; and means connecting said output electrode of said controlled rectifier to said drive circuitry for altering the bias thereof when said sensing means provides said control signal to bias said drive circuitry in an inoperative condition.

2. Protection circuitry as defined in claim 1 wherein said sensing means includes a zener diode.

3. Protection circuitry as defined in claim 1 wherein said source of energizing voltage includes a voltage regulator having a regulator transistor and a driver transistor connected to said regulator transistor; and said sensing means includes a sensing transistor connected between an output of said regulator transistor ane an output of said drive transistor, and means connecting an output electrode of said sensing transistor to said control electrode of said controlled rectifier.

4. In a television receiver having deflection circuitry for generating horizontal and vertical deflection signals, protection circuitry for disabling the horizontal deflection circuitry in response to excessive energizing voltage comprising:

a source of energizing voltage coupled to said horizontal deflection apparatus for providing an energizing voltage thereto;

sensing means connected to said source for providing a control signal in response to an energizing voltage in excess of a predetermined threshold;

current control means having an output electrode and a control electrode connected to said sensing means for switching from a first conducting condition to a second conducting condition in response to said control signal; and means connecting said output electrode to said horizontal deflection circuitry for disabling said horizontal deflection circuitry when said current control means switches to said second conducting condition.

5. Protection circuitry as defined in claim 4 wherein said current control means is a controlled rectifier.

6. Protection circuitry as defined in claim 5 wherein said horizontal deflection circuitry includes an oscillator and a drive transistor connected thereto, said output electrode of said controlled rectifier being connected to a bias circuit for said driver transistor for altering the bias thereof when said controlled rectifier switches to said second conducting condition.

7. Protection circuitry as defined in claim 5 wherein said sensing means includes a zener diode.

8. Protection circuitry as defined in claim 5 wherein said source of energizing voltage includes a voltage regulator having a driver transistor and a regulator transistor connected thereto for providing a regulated energizing voltage; wherein said sensing means includes a sensing transistor having an input electrode connected to said regulator transistor for receiving said energizing voltage, an output electrode, and a reference electrode connected to a point of reference potential; and further including means connecting said output electrode of said sensing transistor to said control electrode of said controlled rectifier.

9. Protection circuitry as defined in claim 8 wherein said point of reference potential is an output electrode of said driver transistor.

10. Protection circuitry for a voltage regulator having a series regulator transistor comprising:

sensing means connected to an output electrode of said regulator transistor for providing a control signal when the voltage of said output electrode exceeds a threshold; and current control means connected between an input electrode of said regulator transistor and a reference potential level and having a control electrode connected to said sensing means for shorting said input electrode of said regulator transistor to said reference potential level in response to said control signal.

11. Protection circuitry as defined in claim 10 wherein said sensing means includes a zener diode and said current control means includes a controlled rectifier.

* * * * *

PO-1050
(5/69)

UNITED STATES PATENT OFFICE
CERTIFICATE OF CORRECTION

Patent No. 3,858,084 Dated December 31, 1974

Inventor(s) David Eugene Manners

It is certified that error appears in the above-identified patent and that said Letters Patent are hereby corrected as shown below:

Col. 1, Line 46: "provide protection" should read --- provide voltage protection ---.

Col. 3, Line 15: "36" should read --- 34 ---.

Col. 5, Line 18: "resistor 45" should read --- transistor 45 ---.

Col. 6, Line 36: "ane" should read --- and ---.

Col. 6, Line 37: "drive" should read --- driver ---.

Col. 6, Line 66: "drive" should read --- driver ---.

Signed and sealed this 4th day of March 1975.

(SEAL)
Attest:

RUTH C. MASON
Attesting Officer

C. MARSHALL DANN
Commissioner of Patents
and Trademarks